Nov. 9, 1937.　　　　H. H. GORRIE　　　　2,098,914
CONTROL SYSTEM
Filed Feb. 25, 1935　　　4 Sheets-Sheet 1

INVENTOR
HARVARD H. GORRIE
BY
Raymond D. Junkins
ATTORNEY

FIG. 2

Patented Nov. 9, 1937

2,098,914

UNITED STATES PATENT OFFICE 2,098,914

CONTROL SYSTEM

Harvard H. Gorrie, Cleveland Heights, Ohio, assignor to Bailey Meter Company, a corporation of Delaware Application February 25, 1935, Serial No. 8,047

11 Claims. (Cl. 50—10)

REISSUED
MAY 20 1941

This invention relates to control systems for establishing or maintaining substantially constant any desired electrical, thermal, chemical, physical or other variable condition through the control of a corrective agent or agents. More particularly my invention relates to control systems wherein a fluid pressure is utilized as the motive power for actuating devices to control the rate of application of corrective agents.

It is an object of my invention to provide a control system wherein the condition under control is rapidly restored to a predetermined value, upon deviation therefrom, without over-travel or hunting.

A further object of my invention is to provide a control system wherein the control of the pressure fluid by a device sensitive to the controlled condition may be readily transferred to manually-operated devices without setting up disturbances in the system.

A further object is to provide a control system wherein individual units, each contributing to the production of the controlled condition may be operated at different rates, one from another, and wherein the control of the rate of supply of an agent, or agents, by the controlled condition to each unit is modified to maintain such units at highest operating efficiency.

These and other objects will be apparent from the following description and the drawings in which.

Figure 1:
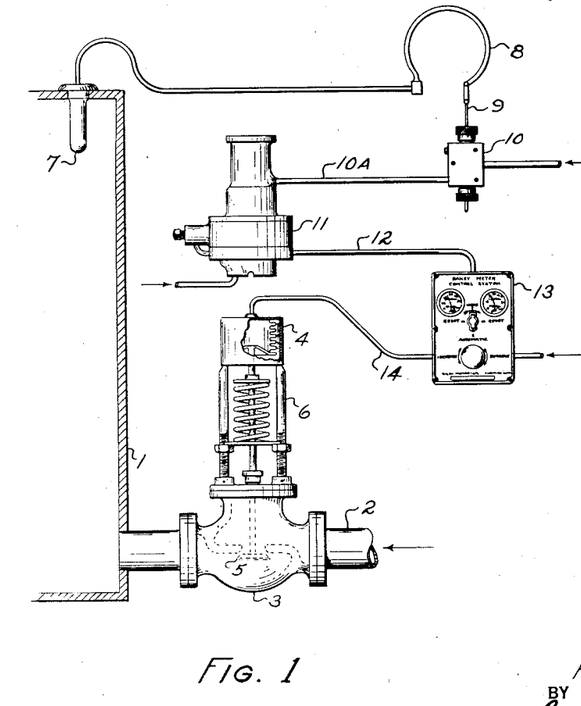
Fig. 1 is a diagrammatic representation of a control system embodying my invention.

Referring to Fig. 1, I have therein shown my control system utilized to maintain a predetermined temperature within a tank 1, which is supplied with a heating agent such as steam through a conduit 2. For regulating the flow of steam to the tank a valve 3 is located in the conduit 2 and actuated by a pressure fluid motor 4. As shown the pressure fluid motor 4 is effective for positioning a movable valve member 5 against the progressively increasing resistance of a spring 6 as the pressure of the fluid supplied the motor 4 increases.

Within the tank 1 may be disposed the bulb 7 of a temperature sensitive device having a Bourdon tube 8 adapted to position a movable valve member 9 of a pilot valve 10 to establish a fluid pressure in accordance with the temperature within the tank 1. This pressure is in turn effective through the agency of a standardizing or pressure balancing relay 11 for establishing a loading pressure normally governing the actuation of the motor 4. The loading pressure is conducted through a pipe 12 to a selector valve 13 wherein it is effective for establishing a control pressure transmitted through the pipe 14 to the motor 4. The arrangement is such that as the temperature within the tank 1 increases, the pressure transmitted to the standardizing device 11 through the agency of the pilot 10 is proportionately decreased, thereby effecting a movement of the valve member 5 in a closing direction to decrease the rate of flow of steam to the tank 1.

The selector valve 13 is provided with suitable manually-operated valves and mechanisms whereby control of the motor 4 may readily be transferred from the loading pressure established by the standardizing relay 11 to a loading pressure established by an operator or attendant.

Figures 4, 5:
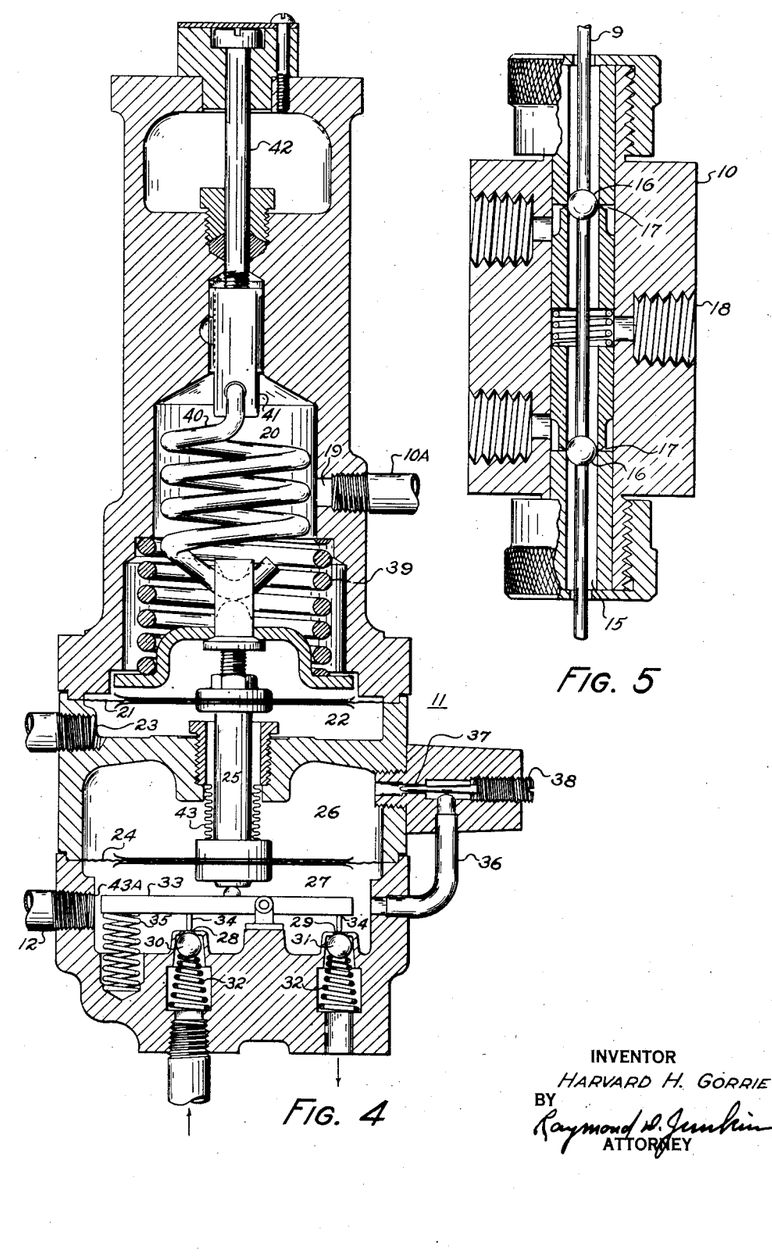
Fig. 4 is a sectional elevation of a standardizing or pressure balancing device utilized in my invention.
Fig. 5 is a sectional elevation of one type of pilot valve which may be utilized with my invention.

In Fig. 5 I have shown in detail the pilot valve 10 which I employ as a part of my control system, and which forms the subject matter of an application of Clarence Johnson, Serial No. 673,212 filed in the United States Patent Office May 27, 1933. The movable valve member 9 extends longitudinally through a passageway 15 and is provided with lands 16 positioned adjacent annular outlet ports 17. Fluid pressure is admitted to the passageway 15 through an inlet port 18 and is reduced to substantially atmospheric pressure in passing the lands 16 which are of slightly less diameter than that of the passageway 15. Thus a constant flow of pressure fluid exists through the passageway 15 around the lands 16 to the atmosphere at each end of casing 10. It is evident therefore that a pressure gradient exists across each land 16 and the pressure established at the outlet ports will depend upon the position of the lands 16 relative to the ports 17. The ports 17 are of relatively narrow width compared to the length of the lands 16, so that if desired a range of pressures at the outlet ports 17 may be established from substantially atmospheric pressure to the pressure of the fluid admitted to the passageway 15 from the inlet port 18. Movement of the member 9 necessary to produce the desired range in pressures may be varied by changing the shape of the lands 16. For example, if it is desired that the complete range in pressures be produced by a small movement of the member 9, the lands may be made relatively short, whereas if it is desired that a considerable motion of the member 9 be required they may be elongated and their shape varied to give any desired characteristic between movement of the valve member 9 and pressure at the ports 17.

It is to be noted that as the movable valve member 9 is positioned upwardly (Fig. 5), the pressure established at the upper outlet port 17 increases, whereas that established at the lower outlet port 17 decreases. By this arrangement it is possible to obtain a loading pressure, either varying directly with the magnitude of the controlled condition, or inversely as the magnitude of the controlled condition. In practice it is customary to insert a suitable plug in the port not in use, for example, the control system illustrated in Fig. 1 is arranged to establish a loading pressure varying inversely as the temperature within the tank 1. Therefore, connection from the pilot 10 to the pressure balancing relay 11 is made to the lower port and a suitable plug inserted in the upper outlet port 17.

It is an object of the control system disclosed in Fig. 1 to maintain the temperature within the tank 1 at some predetermined or desired magnitude. One type of control system well known in the art attempts to accomplish this by positioning the valve 5 in proper sense to restore the temperature to the predetermined magnitude at a rate proportional to the amount of deviation of the actual temperature from the desired temperature. This type of control, which I have termed "floating control" frequently produces a hunting cycle, particularly if the rate of response of the temperature or other controlled condition to variations in the rate of supply of the agent producing the controlled condition is delayed. Thus the rate of supply of steam to the tank 1 may have been increased sufficiently to restore the temperature to the desired value, while due to the time delay or lag between the increase in rate and temperature response, the temperature within the tank 1 is still below the desired magnitude. Accordingly this type of control will continue to increase the rate of admission of steam to the tank 1, when actually the rate of admission has been increased above that necessary. Accordingly, the temperature will eventually rise above that desired and the control system operate to decrease the rate of supply of steam. However, before the temperature is reduced to that desired, the control system will have operated to decrease the rate of admission of steam below that necessary to produce the desired temperature, thus causing the temperature to fall below that desired; the alternate rise and fall continuing indefinitely, such a cycle being commonly termed a "hunting cycle" which may or may not be attenuated.

A second type of control commonly employed is known as "positioning control" wherein for every value of the controlled condition there is maintained a certain rate of application of the agent, or agents, producing that condition. For example, in the embodiment disclosed in Fig. 1 this type of control would upon a decrease in temperature within the tank 1 of a certain amount operate to open the valve 3 a predetermined amount, thus increasing the rate of admission of steam to the tank. This type of control may be readily adjusted so that no appreciable over-shooting or hunting occurs. As readily apparent, however, it does not maintain the controlled condition at an exact predetermined or desired magnitude, but merely maintains it within a predetermined range of values, and for this reason is frequently objectionable. In my invention I have combined the salient features of both systems and have produced a control system inherently stable in that there is no tendency to set up a hunting cycle or to over-shoot, and at the same time maintaining the controlled condition at the predetermined or desired magnitude. I have accomplished this desired result by combining the two systems, and have devised what I conveniently term a "positioning-floating" control. Upon a deviation of the controlled condition from the desired magnitude my improved control system first operates to vary the rate of application of the agent, or agents, producing the condition a proportional amount, and thereafter to slowly vary the rate of application of the agent, or agents, until the condition is restored to the desired magnitude. Basically the control system operates to first give a response proportional to the rate of change in magnitude of the condition being controlled, and thereafter to give a continuing response initially proportional to the amount of deviation of the controlled condition from the desired magnitude. By thus combining the two systems the range of the positioning control may be sufficiently great so that the rate of application of the agent, or agents, is varied only sufficiently to materially retard or stop a further deviation of the controlled condition from the desired value. Thereafter the "floating control" continuously tends to effect a further variation in the rate of application of the agent, or agents, until the controlled condition is restored to the desired magnitude. However, as the controlled condition is returning toward the desired magnitude the positioning control effects a corrective action in a sense tending to prevent the return of the controlled condition to the desired magnitude; the floating control does not produce a hunting cycle, but the approach to the desired magnitude is made asymptotically.

In the control system shown in Fig. 1 the standardizing or pressure balancing relay 11 sensitive to the pressures established by the pilot 10 establishes a loading pressure governing the actuation of the motor 4 in accordance with the principles briefly described. Referring now to Fig. 4 the pressures established by the pilot valve 10 are admitted through a port 19 to a chamber 20, one side of which comprises a flexible wall or diaphragm 21. The diaphragm 21 also forms one side of a chamber 22, which may or may not be open to the atmosphere through a port 23, depending upon the use to which the device may be put, as hereinafter more fully explained. The diaphragm 21 is connected to a diaphragm 24 by suitable mechanical means shown as a movable member 25. The diaphragm 24 forms a bleed chamber 26 and a control chamber 27. Pressure fluid from a suitable source may be admitted to the chamber 27 through a port 28 and may be exhausted through a port 29. Movable ball valve members 30 and 31 normally urged against the ports 28 and 29 respectively, by springs 32 are adapted to control the passage of pressure fluid to and from the chamber 27.

So that the pressure within the chamber 20 necessary to maintain the movable member 25 in the neutral position may be varied as desired, a compression spring 39 and a tension spring 40 are shown located within the chamber 20. The compression spring 39 is arranged to produce a downwardly acting force upon the member 25, whereas the tension spring 40 is arranged to produce an upwardly acting force on the member 25. The tension spring 40 is shown secured to a longitudinally movable block 41. A manually adjustable means comprising a screw 42 threaded into the block 41 provides a means for positioning the block 41 to vary the effective force of the tension spring 40 upon the member 25, and correspondingly vary the value of the pressure in the chamber 20 which will maintain diaphragm 21 and member 25 in neutral position.

Disposed within the chamber 27 and fulcrumed intermediate the valve members 30 and 31 is a beam 33 carrying depending extensions 34, adapted to engage the valve members 30 or 31 upon angular displacement of the beam 33 from the horizontal or neutral position. The beam 33 is urged by a spring 35 against the member 25, downward movement of which causes the beam 33 to be positioned in a counter-clockwise direction, forcing the valve member 30 away from the port 28 and admitting pressure fluid to the chamber 27. Conversely, upward movement of the member 25 causes the beam 33 to be positioned by spring 35 in a clockwise direction forcing the valve member 31 from the port 29 and exhausting pressure fluid from within the chamber 27.

The bleed chamber 26 is shown in communication with the control chamber 27 through a pipe 36 and a throttling valve 37 provided with an adjustable valve member 38 for varying the resistance to the passage of pressure fluid between the chambers. With the valve member 38 in a position to completely prohibit passage of pressure fluid, an increase in pressure within the chamber 20 will increase the force acting downwardly upon the diaphragm 21 thus producing a downward motion of the member 25 effecting an opening of the port 28, permitting pressure fluid to be admitted to the chamber 27 until the increasing pressure therein acting upwardly is sufficient to balance the increase of pressure within the chamber 20 when the member 25 will return to the neutral position and valve members 30 and 31 will completely close the ports 28 and 29 respectively. Conversely upon a decrease of pressure within the chamber 20 the member 25 will move upwardly, opening the exhaust valve 31, and allowing pressure fluid within the chamber 27 to exhaust until the pressure therein balances that within the chamber 20, when the member 25 will be restored to the neutral position. So far, the action exemplifies what I have termed "positioning control".

With the adjustable valve member 38 open so that pressures existing within the chambers 26 and 27 immediately equalize, upon the member 25 being moved downwardly from the neutral position by an increase in pressure within the chamber 20 the valve member 30 will remain open until the pressure within the chamber 20 is restored to the original value, as the pressure existing within the chamber 27 would merely counter-balance the pressure in the bleed chamber 26. Thus the sole force acting upon the movable member 25 would be that due to the pressure in chamber 20 against the diaphragm 21. This would result in what I have termed "floating control".

If the throttling valve member 38 is moved to a nearly closed position so that the flow of pressure fluid between the chambers 26 and 27 is materially restricted, then upon a change of pressure within the chamber 20 from the predetermined value either the valve member 30 or 31 will be moved from its seat, but due to the restricted passageway between the chambers 26 and 27 a change in pressure within the chamber 27 will not immediately effect an equal change in the pressure within the bleed chamber 26 and will accordingly produce a force upon the movable member 25 counter-balancing the force produced by the change in pressure within the chamber 20. When, therefore, the change in pressure within the chamber 27 is proportional to the change in pressure within the chamber 20, the member 25 will be restored to its neutral position and a further immediate change of pressure within the chamber 27 will not take place. As, however, there is now a pressure differential existing between the chambers 26 and 27, a seepage of pressure fluid will take place, thus partially neutralizing or counterbalancing the force produced by the pressure within the chamber 27, effective for maintaining the member 25 in a neutral position. The member 25 will be moved from the neutral position, allowing a further change of pressure within the chamber 27, which will cause the seepage of pressure between the chambers 26 and 27 to continue. The pressure within the chamber 27 will accordingly be continuously modified after an initial change due to departure of the pressure within the chamber 20 from the predetermined value. The result is a combination "floating-positioning control", as previously explained.

Appreciating that the principle of operation of a device is frequently more readily understood by reference to specific examples, it may be assumed that the tension of the spring 40 is adjusted so that the member 25 is in the neutral position with a pressure of 18 lb. per square inch existing within the chamber 20, and with equal pressures existing within the chambers 26 and 27 and 22 open to atmosphere. Assume now that the pressure within the chamber 20 is increased to 19 pounds per square inch. Immediately the member 25 will be positioned in a downward direction, moving the valve member 30 from the port 28 and admitting pressure fluid to the chamber 27 until the pressure therein increases one pound per square inch when the force acting upwardly on the diaphragm 24 will balance that acting downwardly on the diaphragm 21, thus returning the member 25 to the neutral position. A differential of one pound will then exist between the chambers 26 and 27. Immediately upon this increase of pressure within the chamber 27, pressure fluid will seep at a rate dependent upon the adjustment of the valve member 38 from the chamber 27 to the chamber 26, decreasing the net force acting upwardly against the diaphragm 24, destroying the state of equilibrium and again producing a downward positioning of the member 25 and opening the valve 30. It will be appreciated that actually the operation is continuous, the pressure within the chamber 27 gradually increasing at a rate dependent upon the differential in pressure existing between the chambers 26 and 27. It is to be further noted that once a differential pressure is established between the chambers 26 and 27, that differential will be substantially maintained until there is a further change in pressure within the chamber 20. For example, assuming that the pressure within the chamber 20 further increases from 19 pounds per square inch to 20 pounds per square inch, the member 25 would immediately be positioned downwardly until there was a proportionate increase in pressure within the chamber 27. A differential pressure of two pounds per square inch would now exist between the chambers 26 and 27, and the seepage of pressure fluid would progress at substantially the square of the rate, so that the pressure existing within the chamber 27 would increase at twice the rate compared to the rate of increase when one pound differential existed between the chambers 26 and 27. If now the pressure within the chamber 20 should decrease to 19 pounds per square inch, an immediate upward positioning of the member 25 would take place moving the valve member 31 from the port 29, and allowing pressure fluid to exhaust from the chamber 27, until the net upward force acting upon the diaphragm 24 had been decreased by one pound per square inch when the member 25 would again be positioned to the neutral position and valve members 30 and 31 would both be in the closed position. However, the pressure existing within the chamber 27 would still be substantially one pound greater than that existing in the chamber 26, thus permitting a seepage of pressure between the two chambers and, in the manner hereinbefore described, to produce a continuously increasing pressure within the chamber 27. Assuming now that the pressure within the chamber 20 should decrease to the neutral pressure of 18 pounds per square inch, the valve member 31 would be opened until no differential existed across the diaphragm 24 effective for producing a force on the member 25, when the member 25 would be positioned to the neutral position.

The chamber 27 is provided with a port 43A which may communicate with suitable responsive devices for governing either directly or indirectly the application of an agent effecting or producing the controlled condition. In Fig. 1 for example, I have shown the pressure established within the chamber 27 in communication through the pipe 12 with a selector valve 13 for governing the pressure fluid effective within the motor 4. The pressure established by the pilot 10, in accordance with the temperature within the tank 1, is transmitted to the chamber 20 and is effective for producing a loading pressure within the chamber 27 varying in accordance with changes in the temperature within the tank 1, and in accordance with the deviation of the temperature from the desired value. In operation the tension of the spring 40 may initially be so adjusted that with the throttling valve member 38 open, allowing pressures to equalize instantaneously between chambers 26 and 27, the member 25 will be in the neutral position when the pressure within the chamber 20 is that established by the desired temperature within the tank 1. The throttling valve member 38 may then be so adjusted as to provide a desired rate of bleed between the chambers 26 and 27. To prevent over-travel or hunting, the member 38 may be so adjusted that after the initial change in the rate of supply of heating fluid produced by a change in pressure within the chamber 20, the rate at which the flow of heating fluid to the tank 1 is varied is slower than, or lags, the responsiveness of the temperature within the tank 1 to changes in the rate of supply of heating fluid.

My control system therefore operates to occasion an initial or primary change in the corrective agent substantially in unison with and in sense dependent upon changes in the magnitude of the controlled condition and thereafter occasions a continuing secondary change substantially proportional to the amount of and in sense dependent upon the deviation of the controlled condition from the desired magnitude; or in other words a control of relatively high sensitivity but low speed is superimposed upon a control of low sensitivity but high speed.

It is desirable in some applications of automatic control systems that the valve or other means of regulating the corrective agent be positioned directly in accordance with variations in the pressure established by the pilot valve or other means sensitive to changes in the controlled condition. Referring to Fig. 1 it may be desirable for example that the pilot valve 10 be arranged to produce an increasing pressure effective upon the standardizing relay 11 with increasing temperatures within the tank 1. The standardizing relay may readily be arranged for proper actuation of the valve 5 by introducing the pressure from the pilot 10 into the chamber 22 through the port 23, permitting the chamber 20 to remain open to the atmosphere. Under such an arrangement, upon the pressure from the pilot valve 10 increasing, due to an increase in the controlled condition above the desired value, the loading pressure within the chamber 27 will in unison therewith be reduced a proportionate amount and thereafter will continue to be reduced substantially in proportion to the amount the pressure within the chamber 22 is above the value corresponding to the desired magnitude of the condition.

In the embodiment of the standardizing relay illustrated in Fig. 4, the area of the diaphragm 24 upon which the pressure fluid within the chamber 26 is effective is less than the area of the diaphragm 24 upon which the pressure fluid within the chamber 27 is effective. For, as shown, the chamber 22 is pressure sealed from the chamber 26 by a suitable expansible contractible bellows 43, which reduces the effective area of the upper side of the diaphragm 24. Accordingly, therefore, for each pressure within the chamber 20 the movable member 25 will be restored to the neutral position when the pressure within the chambers 26 and 27 are equal and of a certain value.

This may be shown mathematically as follows: Let:

$P_0$ = Pressure within chamber 20 corresponding to the desired value of the controlled condition.
$P_1$ = Actual pressure within chamber 20.
$P_2$ = Actual pressure within chamber 22.
$P_3$ = Actual pressure within chamber 26.
$P_4$ = Actual pressure within chamber 27.
$A_1$ = Area upon which pressure $P_1$ is effective.
$A_2$ = Area upon which pressure $P_2$ is effective.
$A_3$ = Area upon which pressure $P_3$ is effective.
$A_4$ = Area upon which pressure $P_4$ is effective.
$S$ = Initial spring force.

Then when member 25 is in the neutral position:

$$P_1A_1 - P_2A_2 + P_3A_3 - P_4A_4 - S = 0 \quad (1)$$

But by construction:

$A_1 = A_4$
$P_2A_2 = K_1 = $ A constant
$S = K_2 = $ A constant

And when in equilibrium:

$$P_3 = P_4$$

Then:

$$P_1 = \frac{P_2A_2 - P_4A_3 + P_4A_1 + S}{A_1} \quad (2)$$

Let:

$$P_2A_2 + S = K_3$$

Then:

$$P_1 = \frac{P_4(A_1 - A_3) + K_3}{A_1} \quad (3)$$

But by adjustment at $P_0$ (Calibration):

$$P_0 = P_1 = P_4$$

Then from (3):

$$P_0 = \frac{P_0(A_1 - A_3) + K_3}{A_1} \quad (4)$$

Which reduces to:

$$K_3 = P_0A_3 \quad (5)$$

Therefore:

$$P_1 = \frac{P_4(A_1 - A_3) + P_0A_3}{A_1} \quad (6)$$

Or:

$$P_4 = \frac{P_1A_1 - P_0A_3}{(A_1 - A_3)} \quad (7)$$

And if:

$$(A_1 - A_3) = 0, \quad P_4 = \infty$$

Thus for each value of $P_1$ there exists a certain value of $P_4$ at which the member 25 will be in the neutral position. For a given value of $P_1$ the corresponding neutral value of $P_4$ increases as $(A_1 - A_3)$, which is the area of the expansible contractible bellows 43, decreases; and when $(A_1 - A_3)$ is 0 then for each value of $P_1$, $P_4$ will have a neutral value of infinity.

In general it is apparent therefore that the standardizing relay 11 as shown in Fig. 4 operates to produce an initial response in proportion to and in unison with changes in the controlled condition; and thereafter to produce a delayed response initially proportional to the amount of deviation of the controlled condition from the desired value, and continuing until a predetermined relation exists between the loading pressure within the chamber 20 and the controlling pressures within the chambers 26 and 27. Or in general it may be said to superimpose a secondary slow speed positioning control of relatively high sensitivity upon a primary high speed positioning control of relatively low sensitivity. It is apparent that by varying the effective area upon which the pressure within the chamber 25 is effective, which may readily be accomplished by varying the diameter of the bellows 43, any relation desired may be obtained between the primary and secondary controls.

The condition hereinbefore mentioned when $(A_1 - A_3)$ equals 0, and no value of $P_4$ other than infinity satisfies the equation of equilibrium, may be obtained by introducing the loading pressure $(P_1)$ into the chamber 26, and connecting the pipe 36 and throttling valve 37 to the chamber 20.

Thus as the effective area of the diaphragm 21 is equal to the effective area of the diaphragm 24 upon which the controlling fluid pressure within the chamber 27 is effective, $(A_1 - A_3)$ equals 0, and upon a deviation of the controlled condition from the desired value the rate of application of the corrective agent will be varied until the controlled condition is restored to the desired value or until the regulator of the corrective agent reaches an extreme of travel. It is apparent that the relative areas of the diaphragms 21 and 24 may be varied as desired so that the secondary response may bear any desired relation to the primary response, or so that the change in loading pressure produced in the control chamber 27 for a given change in pressure within the chamber 20, or 22, may be varied as desired.

Figure 6:
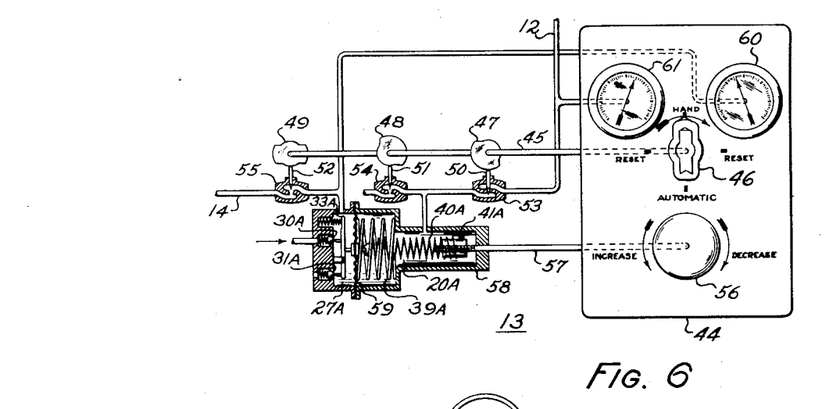
Fig. 6 is a schematic illustration partially in section of a selector switch utilized in my invention.

In Fig. 1 I have shown the controlling fluid pressure conducted from the standardizing or pressure balancing relay 11 through a pipe 12 to a selector switch 13, which provides a convenient means for readily transferring control of the motor 4 either partially or entirely from the controlled condition to manual control. In Fig. 6 I have schematically illustrated the selector valve 13 provided with a suitable mounting plate 44, readily fastened to a panel or other mounting means. Journaled in the mounting plate 44 and extending rearwardly therefrom is a cam shaft 45, to which is secured a hand operable valve switch 46. Suitably arranged on the cam shaft are cams 47, 48 and 49 for positioning the movable valves 50, 51 and 52 of valve bodies 53, 54 and 55 respectively. On the mounting plate 44 may be inscribed suitable legends for indicating the existing status of the control system and directions for transferring the control from automatic to hand, or vice versa. As shown, the valve switch 46 is in the "hand" position, indicating that the valves 50, 51 and 52 are positioned so that the controlling pressure transmitted to the valve 3 may be varied manually entirely independent of the loading pressure produced by the standardizing relay 11; by angularly positioning a knob 56. As indicated by the legend angular positioning of the knob 56 in a clockwise direction decreases the controlling pressure whereas counter-clockwise positioning increases the controlling pressure.

Manual positioning of the knob 56 serves to actuate a relay 58, which in many aspects is similar to the standardizing or pressure-balancing relay 11 hereinbefore described. The knob 56 is secured to a shaft 57 journaled in the mounting plate 44, and passes through the wall of the relay 58. The relay 58 is divided into two chambers 20A and 27A by a diaphragm 59. Positioned in the chamber 20A is a compression spring 39A urging the diaphragm 59 in one direction. Likewise positioned in the chamber 20A is a tension spring 40A fastened to the diaphragm 59 and to a longitudinally movable block 41A, and urging the diaphragm 59 in the opposite direction. The movable block 41A is threaded to the shaft 57 and upon angular positioning of the shaft 57 is moved longitudinally in the chamber 20A, thus increasing or decreasing the tension of the spring 40A. When the knob 56 is angularly positioned in a clockwise direction the movable block 41A is moved to the right, as viewed in the drawings, thus increasing the tension of the spring 40A, and reducing the net force of the springs 39A and 40A against the diaphragm 59.

Located in the chamber 27A is a fulcrumed beam 33A adapted to actuate a pressure fluid inlet valve 30A when displaced from the neutral position in a counter-clockwise direction, or to actuate a pressure fluid exhaust valve 31A when displaced from the neutral position in a clockwise direction. Pressure fluid admitted to the chamber 27A is effective for maintaining the diaphragm 59 in a neutral position and is transmitted through the valve 55 to the pipe 14 for actuating the motor 4.

The movable valve member 50 controlling the ingress of fluid pressure from the pipe 12 to the chamber 20A is shown in the closed position, whereas the movable valve member 51, permitting egress of the pressure fluid within the chamber 20A to the atmosphere, is open. Accordingly the force urging the diaphragm 59 to the left, as viewed in Fig. 6, is that produced by the springs 39A and 40A. If for example it is desired to reduce the fluid pressure effective on the motor 4, the hand operable knob 56 is rotated in a clockwise direction, thus increasing the tension of the spring 40A, but reducing the net force urging the diaphragm 59 to the left. Accordingly the pressure necessary to produce an equal but opposite force to maintain the fulcrumed beam 33A in the neutral position is reduced, and the fulcrum beam 33A is displaced clockwise actuating the valve member 31A allowing the pressure within the chamber 27A to decrease until it is in proportion to the force produced by the springs 39A, 40A. Further displacement of the knob 56 effects a further decrease in fluid pressure necessary to maintain the diaphragm 59 in the neutral position, and the relay 58 provides a convenient manually-operable means for varying the fluid pressure effective upon the motor 4 through any range desired.

In order that the operator may be advised of the position of the valve 5 at all times, a pressure gage 60 may be provided, which is connected to the chamber 27A. As the valve 5 is positioned in accordance with the pressure fluid transmitted to the motor 4 from the chamber 27A an indication of such pressure is in reality an indication of the position of valve 5, and the gage 60 may if desired be graduated to indicate valve position. An operator thus manually adjusting the control system is continuously and instantaneously advised of changes in the rate of application of the corrective agent.

When it is desired to transfer the means regulating the rate of application of the corrective agent from hand to automatic control, the transfer switch 46 is rotated 90° in the direction indicated by the arrow to the "reset" position. Such rotation effects an opening of the valve 53, and a closure of the valves 54 and 55. Pressure variations from the standardizing relay 11 are thus transmitted through the pipe 12 to the chamber 20A and are effective upon the diaphragm 59. The magnitude of the pressure within the pipe 12 is indicated by a gage 61. An operator may then observe the difference between the loading pressure produced by the standardizing relay 11 and that which will be made effective upon the motor 4 by determining the difference between the readings of the gages 60 and 61. In order that the transfer from hand to automatic control may be made as smoothly as possible without causing disturbances in the system it is desirable that the difference in the loading pressure transmitted through the pipe 12 and that which will be made effective upon the motor 4 through the pipe 14, be as small as possible before the transfer is made. Thus with the transfer switch in the reset position an operator is given an opportunity to determine this difference, and by proper manipulation of the knob 56 may make the pressures identical before making the transfer.

Further displacement of the transfer switch 46 from the reset position to the automatic position permits the valve 53 to remain open, the valve 54 to remain closed, but opens the valve 55, thus permitting pressures within the chamber 27A to be transmitted through the pipe 14 to the motor 4 and variations in loading pressure conducted through the pipe 12 to the chamber 20A will thereafter produce corresponding variations in the controlling pressure transmitted to the motor 4. If desired the controlling pressure transmitted to the motor 4, may be increased above or decreased below the loading pressure established in the chamber 20A by manual operation of the knob 56, which thus provides a means for modifying the control of the rate of application of the producing agent by the controlled condition to compensate or correct, for example, for variations in the thermal content, chemical constituents, etc., of the producing agent.

In transferring from automatic to hand control it is also desirable that the operation be accomplished without undue disturbance in the control system or in the apparatus to which it is applied. To accomplish this a reset position is provided as shown between the automatic and hand positions. In this reset position valve 55 is closed, valve 54 is opened, allowing the pressure fluid within the chamber 20A to exhaust; and valve 53 is closed. The knob 56 may then be manipulated until the controlling pressure is substantially the same as existed immediately prior to the transfer switch 46 being moved from the automatic position to the reset position; and as the valve 55 is closed such adjustment may be made without disturbing the position of the valve 5. After the controlling fluid pressure has been brought to the desired value by manipulation of the knob 56, the transfer switch may be turned to the "Hand" position, with the assurance that the valve 5 will not be positioned suddenly from its former position.

Figure 2:
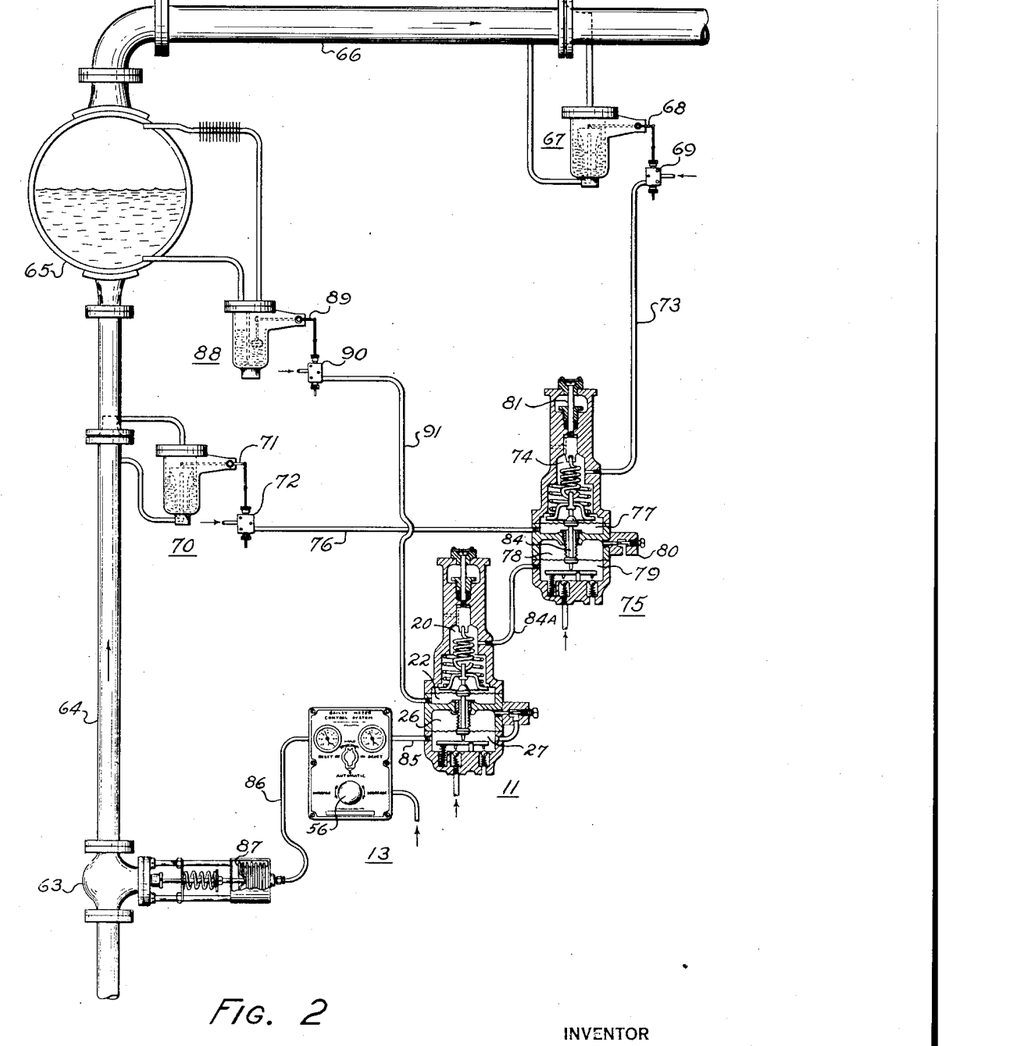
Fig. 2 is a diagrammatic representation of another control system embodying my invention.

In Fig. 2 I have shown instrumentalities in which my invention is embodied, utilized to control the flow of feed water to a boiler. Such a control system may be of the 3-element type wherein the flow of feed water is regulated in accordance with the three elements—steam flow from the boiler, feed water to the boiler, and water level in the boiler drum. In the drawings a valve 63 is positioned in a pipe 64 for the control of feed water to the steam and water drum 65 of a boiler (not shown), and a conduit 66 is provided for transmittal of steam from the drum 65 to a point of usage (not shown). The rate of steam flow through the conduit 66 is measured by a suitable flow meter 67 which may be of the type disclosed in Patent 1,123,164 to Bailey. The flow meter 67 is provided with an arm 68 angularly positioned in accordance with the rate of flow of steam through the conduit 66, and adapted to position a pilot valve 69, similar to that shown in Fig. 5, to establish a fluid pressure varying in direct proportion to changes in the rate of flow of steam through the conduit 66. Similar means comprising a rate of flow meter 70, an arm 71 and a pilot 72 is provided for establishing a fluid pressure varying in direct proportion to changes in the rate of flow of feed water through the pipe 64.

The pressure established by the pilot 69 is transmitted through a pipe 73 to a chamber 74 of a pressure balancing relay 75. Similarly, pressures established by the pilot 72 are transmitted through a pipe 76 to a chamber 77 of the relay 75. The relay 75 is similar to the pressure balancing relay 11 except that no connection is provided between chambers 78 and 79 corresponding respectively to chambers 26 and 27 of relay 11. The chamber 78 being open to the atmosphere through the throttling valve 80, the pressure balancing relay 75 will operate to establish a loading pressure within the chamber 79 proportional to the differential in pressures admitted to the chambers 74 and 77. The magnitude of the pressure maintained in chamber 79 for a given differential between chambers 74 and 77 may be brought to any desired value by the manually adjustable screw 81 effective for varying the net force of the springs acting upon the movable member 84. In operation, upon an increase in the loading pressure within the chamber 74, due to an increase in the rate of flow of steam through the conduit 66, the movable member 84 will move downward allowing pressure fluid to enter the chamber 79 until the increase in pressure within the chamber 79 balances the increase in pressure in the chamber 74, when the movable member 84 will be restored to the neutral position. Conversely upon an increase in the rate of flow of feed water through the pipe 64, the pressure within the chamber 77 will increase, causing the movable member 84 to move upward and allowing pressure fluid to exhaust from the chamber 79 until the decrease in pressure within the chamber 79 is equal to or proportional to the increase in pressure within the chamber 77, when the movable member 84 will return to the neutral position. If the pressures within the chambers 74 and 77 increase or decrease in unison, there will be no change in the force acting upon the movable member 84 and the pressure within the chamber 79 will remain constant. The fluid pressure within the chamber 79 is therefore a measure of the differential in pressures existing within the chambers 74 and 77. Or as the pressures established within the chambers 74 and 77 are proportional to the rates of steam flow through the conduit 66 and the rate of flow of feed water through the pipe 64, variations in pressure within the chamber 79 are inferentially a measure of the difference in rate of feed water to the boiler and rate of steam flow from the boiler. When the rate of flow of feed water through the pipe 64 is equal to or in desired proportion to the rate of flow of steam through the conduit 66, the pressure within the chamber 79 will be at some predetermined magnitude as established by the adjustment of the screw 81. Upon an increase in the rate of flow of steam flow above the rate of flow of feed water, the pressure within the chamber 79 will increase in proportion to the difference in rate. Correspondingly should the rate of flow of steam decrease below the rate of flow of feed water, the pressure within the chamber 79 will decrease proportionately.

In the control system shown in Fig. 2, I preferably utilize the pressure established within the chamber 79 as an indication of the ratio between the rate of flow of feed water to the boiler and rate of flow of steam flow from the boiler and then control the rate of flow of feed water to the boiler through the agency of the valve 63 to maintain the said ratio at a predetermined value, such as unity. In producing a fluid pressure for regulating the positioning of the valve 63, use may be made of a standardizing relay such as shown in Fig. 4. In Fig. 2 the pressure within the chamber 79 is transmitted through a pipe 84A to the chamber 20 of the standardizing relay 11. Accordingly upon a deviation of pressure within the chamber 20 from a predetermined value the loading pressure within the chamber 27 will first vary proportionately, and thereafter continue to vary until the pressure within the chamber 20 is restored to the desired value. The loading pressure established within the chamber 27 is transmitted to the selector valve 13 through the pipe 85 and the controlling pressure established by the loading pressure, and as may be modified by manual positioning of the knob 56 is conducted through a pipe 86 to the motor 87 for positioning the valve 63.

In operation, assuming the system to be in equilibrium, that is that the rate of flow of steam through the conduit 66 is equal to or in desired proportion to the rate of flow of feed water through the pipe 64, that upon an increase in the rate of flow of steam through the conduit 66, the pressure within the chamber 74 will increase, producing a proportionate increase in the pressure within the chamber 79. The pressure established within the chamber 79 will be effective within the chamber 20 of the standardizing relay 11 for producing an initial increase in loading pressure within the chamber 27, and thereafter to produce a continuous increase in loading pressure within the chamber 27. The loading pressure established within the chamber 27 will be effective through the agency of the selector valve 13 for increasing the pressure fluid effective within the motor 87, thus positioning the valve 63 in an opening direction, increasing the rate of flow of feed water through the pipe 64. The pressure fluid effective within the motor 87 will continue to increase due to the continuing increase in pressure within the chamber 27 until the rate of flow of feed water through the pipe 64 is again equal to or in desired proportion to the rate of steam flow through the conduit 66. When this latter condition obtains, the loading pressure within the chamber 27 will remain constant until there is a further change in the pressure established within the chamber 79, due to a deviation from the predetermined ratio between the pressures within the chambers 74 and 77.

While the system so far described will maintain the rate of flow of feed water to the boiler equal to or in desired proportion to the rate of flow of steam from the boiler, it is necessary in order to maintain the water level within the boiler drum 65 within certain limits to modify the control of rate of flow of feed water by rate of flow of steam in accordance with variations in the water level. Such modification may operate to maintain a constant water level within the boiler throughout the range in rating, or as is sometimes desired it may operate to maintain a water level varying in desired manner with rating. In Fig. 2 the control of the rate of flow of feed water through the pipe 64 is modified in accordance with variations in the water level by establishing a pressure varying in accordance with water level. The apparatus provided comprises a mercury float actuated boiler water level indicator 88, having an arm 89 angularly positioned in accordance with variations in water level. The pilot valve 90 is positioned by the arm 89 and establishes a pressure proportional to the water level, which is transmitted to the chamber 22 of the device 11 through a pipe 91. Upon a decrease in water level the fluid pressure established by the pilot 90 will decrease, effecting a downward positioning of the movable member 25 of the relay 11 to effect an increase of pressure within the chamber 27, effective through the selector valve 13 for establishing a controlling pressure in the motor 87 for opening the valve 63 to increase the rate of flow of feed water through the pipe 64, thus producing an increase in water level. Conversely upon an increase in water level the fluid pressure established by the pilot 90 will increase, effecting an upward positioning of the movable member 25, decreasing the pressure within the chamber 27 and correspondingly producing a positioning of the valve 63 to decrease the rate of flow of feed water to the pipe 64, which will produce a lower water level.

The selector valve 13 may be used as hereinbefore described to transfer the operation of the valve 63 from automatic to hand control, or to modify the control of the valve 63 by the loading pressure established in the chamber 27 as may be desired to compensate for temporary conditions, inaccuracy in the system, etc.

Certain features of the control system disclosed by Fig. 2 and the description relating thereto, but not claimed herein, form the subject matter of a co-pending application for Letters Patent of the United States filed concurrently herewith by Paul S. Dickey, Serial #8,023, to which reference may be had for a more detailed description.

Figure 3:
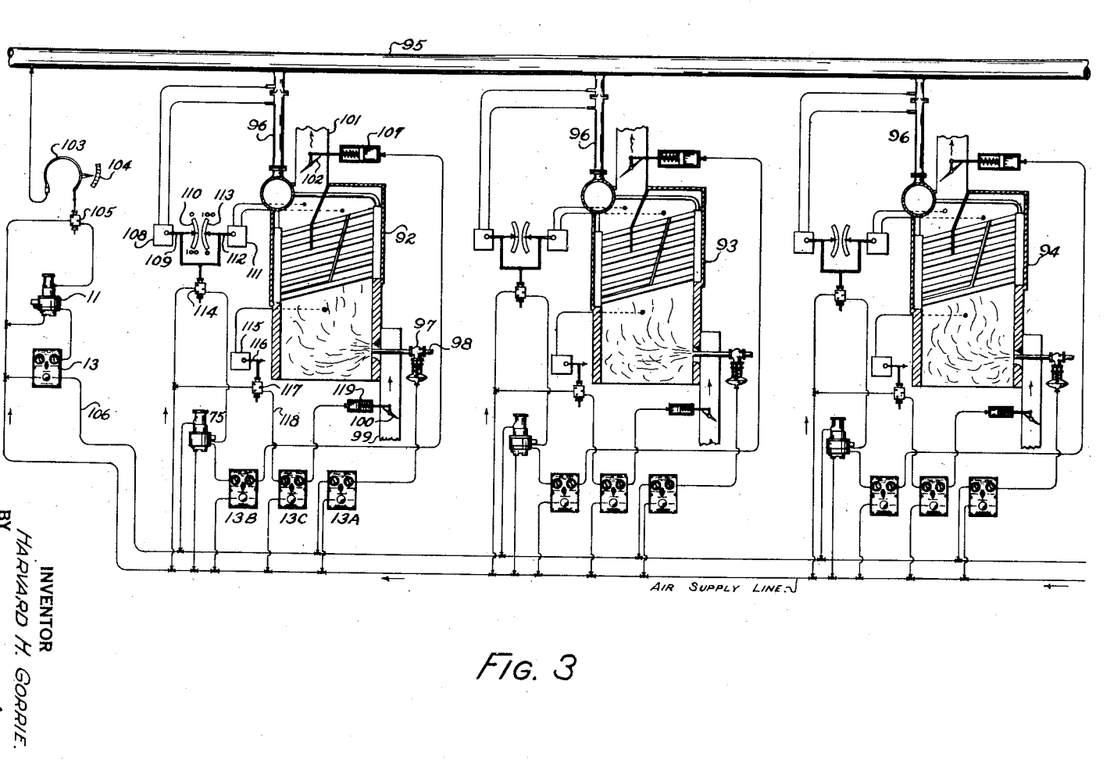
Fig. 3 is a diagrammatic representation of another arrangement to which the invention is applied.

In Fig. 3 I have shown a control system embodying my invention applied to the regulation of a vapor generating plant. In the drawings a plurality of vapor generators, 92, 93 and 94, are arranged to discharge steam into a common header 95 through steam pipes 96. The rate of fuel supply to each boiler is controlled by a valve 97, positioned in a fuel supply line 98. Air for combustion is admitted to the furnace through a duct 99, in which is positioned a damper 100 for controlling the rate of air supply. The products of combustion are withdrawn through a stack 101, in which is positioned a damper 102 for controlling the rate of discharge of the products of combustion from the generator.

The control system as illustrated operates to maintain a rate of combustion sufficient to supply the varying demands of steam, as indicated by changes in the steam pressure, and further to control the ratio of air to fuel supplied each boiler to maintain operation of the plant at maximum efficiency. A Bourdon tube 103 is arranged to indicate the pressure of the steam in cooperation with a scale 104, and also to position a pilot valve 105 for establishing a fluid pressure varying inversely as the pressure of the steam within the conduit 95. Such pressure is transmitted to the standardizing relay 11, which operates in a manner hereinbefore described to establish a loading pressure effective for controlling the rate of supply of fuel and air to all of the boilers in unison. This loading pressure is preferably relayed through a selector valve 13, so that the entire plant may be readily transferred from automatic to hand control, or the automatic control modified to suit temporary conditions. The instrumentalities comprising the Bourdon tube 103, pilot 105, standardizing relay 11, and selector switch 13, may be termed a master control inasmuch as they function to effect the operation of all of the boilers in unison, and furthermore are devoted to the maintenance of a predetermined pressure, as for upon a deviation of pressure from the desired magnitude a pressure will be established by the pilot 105 effective through the agency of the standardizing relay 11 for producing a loading pressure instantaneously varying in accordance with the deviation of pressure from the desired value, and thereafter continuing to change in a sense to restore the pressure to the desired value. The standardizing relay 11 as applied to the specific application shown in Fig. 3 acts to give an immediate corrective action proportional to the rate of change in pressure and thereafter to give a continuing corrective action proportional to the amount of deviation of the pressure from the desired value.

The loading pressure established by the standardizing relay 11, as relayed through the selector switch 13, is conducted to boilers 92, 93 and 94, through a pipe 106, and is adapted to control the actuation of a fluid pressure motor 107 positioning the damper 102 and of the fuel supply valve 97. Thus upon a decrease of vapor pressure within the conduit 95 the loading pressure established by the standardizing relay 11 will increase in unison therewith, effecting a positioning of the fuel supply valve 97 and the damper 102 to increase the rate of fuel supply and air supply to each boiler in parallel. Thereafter the loading pressure will continue to increase in proportion to the amount of deviation of the steam pressure below the desired value, and effect a further continuing positioning of the fuel supply valve 97 and damper 102 to effect a further increase in the rate of fuel and air supply to each boiler until the steam pressure is restored to the desired value.

The loading pressure established by the standardizing relay 11 effective for positioning the fuel supply valve 97 is preferably relayed through a selector valve 13A, so that the rate of fuel supply to each boiler may be readily transferred from automatic to hand control, or the control of fuel modified in accordance with local boiler conditions. As well understood in the art it is frequently desirable that one or more boilers be maintained at a constant rate of steaming, and the variations in load compensated for by varying the ratings on the remaining boilers. The provision of the individual selector valves 13A in the lines to the fuel supply valves 97 provides a means for readily maintaining any boiler at a predetermined rate of vapor generation. It is also frequently desirable that, while several of the boilers vary in rating in accordance with variations in vapor usage, that some of the boilers be operated at a proportionately higher rating than the others. The selector valve provides a means for readily modifying the control of fuel to provide for this arrangement.

As well known, the ratio between fuel and air supply to the boiler must be maintained at a predetermined value for maximum operating efficiency. To furnish air in excess of the amount dictated by this ratio, or to supply it in less amount, results in a decrease in efficiency. Accordingly, an automatic control system after an adjustment of the fuel and air to satisfy a change in requirements for steam production, should readjust the supply of air if the ratio between fuel and air deviates from the value giving maximum efficiency. In the drawings I have shown a combustion control system, accomplishing this through the agency of my improved control devices. At 108 I have shown a meter of the rate of flow of steam from each of the boilers. The meter 108 is provided with an indicator 109, which in cooperation with a scale 110 will indicate the rate of flow of steam from the boiler. The indicator 109 is adapted to move downward upon an increase in the rate of flow of steam from the boiler. A similar meter 111 is provided with an indicating arm 112 adapted to cooperate with a scale 113 to measure the rate of the flow of products of combustion through the boiler. The indicating arm 112 is adapted to move upward as the rate of flow of products of combustion increases. The rate of flow of products of combustion is inherently an indication of the rate of air supplied to the boiler and the rate of flow of steam flow from the boiler is a measure of the heat supplied by the fuel. Accordingly a predetermined ratio should be maintained between the rate of flow of the products of combustion and the rate of flow of steam flow from the boiler for maximum combustion. Such a relation gage as I have herein described and shown more or less diagrammatically may be of the type shown and described in Patent #1,257,965 to Bailey.

The meters 108 and 111 are adapted to position a pilot valve 114 through a suitable differential linkage to establish a loading pressure in accordance with the ratio between the rate of flow of steam from the boiler and rate of flow of products of combustion through the boiler. In order that the rate of flow of air through the boiler may be varied in response to variations in vapor pressure, and also modified to maintain a predetermined relation between the fuel supply and air supply, I have found it advantageous to utilize the pressure averaging relay 75 to produce a loading pressure varying in accordance with the sum of the loading pressures established in accordance with the magnitude of the steam pressure, and the loading pressure established in accordance with the ratio between fuel flow and air flow. As in this particular instance I desire to add the two pressures, rather than to produce a loading pressure varying as the difference, I connect the pilot valve 114 to the chamber 78 and the loading pressure from the master standardizing relay 11 to the chamber 74. The pressure established in the chamber 79 will therefore vary in accordance with the sum of the two pressures. This pressure is transmitted to a selector valve 13B and thence relayed to the fluid pressure motor 107. The arrangement is such that upon a decrease in pressure the loading pressure established by the master standardizing relay 11 will increase effecting a positioning of the damper 102 in an opening direction. Likewise an increase in steam flow with no corresponding increase in air flow will cause the loading pressure transmitted from the pilot 114 to increase, thus also serving to position the damper 102 in an opening direction. The pressures effective for positioning the motor 107 are preferably relayed through a selector valve 13B so that the control of air flow through the boiler may be readily transferred from automatic to hand control, or vice versa. The selector valve 13B also makes provision for modifying the control of air flow by steam pressure and the ratio of steam flow-air flow.

To maintain a predetermined furnace draft within the boiler furnace I have provided a meter 115 having an indicating arm 116 positioned in accordance with variations in furnace draft. The pilot valve 117 is positioned by the indicating arm and establishes a loading pressure varying directly with furnace draft. Upon an increase in furnace draft for example, the indicating arm 116 will move downwardly as viewed in the drawings, increasing the loading pressure in a pipe 118, connected to the selector valve 13C. The loading pressure so produced is relayed through the selector valve 13C to a fluid pressure damper operator 119. Upon an increase in furnace draft the indicating arm 116 will be positioned downwardly as viewed in the drawings, increasing the loading pressure controlling the positioning of the valve operator 119, which will position the damper 100 in a direction to increase the rate of flow of air to the furnace, thus restoring the furnace draft to the predetermined value.

While in the foregoing description I have used specific apparatus to illustrate the operation of my invention and have in cases resorted to certain specific values to more clearly explain the principle of my invention, it is to be understood that I am not to be limited thereby, but that my invention is applicable to a wide variety of applications.

Certain features of my invention disclosed but not claimed herein are disclosed and claimed in my copending application Serial #137,667 filed April 19, 1937, and in my copending application Serial #140,900, filed May 5, 1937.

What I claim as new, and desire to secure by Letters Patent of the United States, is:

1. In a control system, in combination, a fluid pressure conduit, valve means having a neutral position and in said conduit to control the magnitude of the pressure in that portion of the conduit beyond said valve means, means for displacing said valve means from the neutral position to admit pressure fluid to that portion of said conduit beyond said valve means upon departure of a condition to be controlled in one direction from a predetermined value and for displacing said valve means from the neutral position to discharge pressure fluid from that portion of said conduit beyond said valve means upon departure of the condition in opposite direction from the predetermined value, means for restoring the valve to the neutral position controlled by the pressure of the fluid within that portion of said conduit beyond said valve means, and means controlled by the pressure of the fluid within that portion of the conduit beyond said valve means for preventing the valve from remaining in neutral position until the condition attains a predetermined value.

2. A pressure balancing device comprising in combination, a first pressure chamber having a flexible wall, an enclosure forming second and third pressure chambers separated by a common flexible wall, a restricted connection between said last named chambers, mechanical means connecting the flexible walls together for simultaneous movement, openings in said third named chamber for the admission and discharge of pressure fluid from said chamber, and a fulcrumed beam positioned in said third chamber provided with valve members for governing the admission and discharge of pressure fluid from said chamber having a neutral position, said beam actuated by said mechanical means to maintain a pressure within said third named chamber tending to hold the fulcrumed beam in the neutral position.

3. In a control system, in combination, means sensitive to a condition to be controlled, valve means actuated by said first named means for producing a first fluid pressure in accordance with the magnitude of the condition, a pressure balancing device comprising a pressure chamber having a flexible wall, means for admitting the first fluid pressure to said chamber, an enclosure forming two pressure chambers separated by a common flexible wall, a restricted connection between said last named chambers, mechanical means connecting the flexible walls together for simultaneous movement, means responsive to the movement of said flexible walls for increasing or decreasing the pressure in one of said last named chambers tending to hold said flexible walls in a neutral position, and regulating means for an agent producing or maintaining said condition controlled by the last named pressure.

4. A pressure balancing device comprising in combination a first pressure chamber having a movable wall, a second pressure chamber having a movable wall, valve means for admitting and for discharging pressures from said second pressure chamber, valve members for controlling the flow of pressure fluid through each of said valve means, a fulcrumed beam within the second named pressure chamber for actuating said valve members in unison, yieldable means normally urging said valve members in a closed direction, means for transmitting movements of said movable walls to said fulcrumed beam for actuating said valve members, and means for urging said fulcrumed beam against said last named means.

5. A pressure balancing device comprising in combination, a pair of opposed pressure chambers each having a movable wall, valve ports to one of said chambers for admitting and discharging pressure fluid from said chamber, movable valve members cooperating with said ports in the control of the admission and discharge of the pressure fluid, a beam fulcrumed between said ports for actuating one or the other of said valve members when displaced from the neutral position, resilient means normally urging said valve members to a closed position, mechanical means for transmitting movements of said movable walls to said beam, and hand operable means for producing a variable force on said movable walls.

6. A pressure balancing device comprising in combination, a pair of pressure chambers, a movable member, said chambers arranged to produce opposing forces on said member, valve ports in one of said chambers for admitting and discharging pressure fluid from one of said chambers, movable valve members cooperating with said ports in the control of the pressure fluid, a beam for selectively actuating said valve members arranged to be displaced from a neutral position by said movable member, and means for producing a variable force on said movable member comprising a spring, and hand operable means for varying the tension on said spring.

7. In a control system in combination, means sensitive to a condition to be controlled, valve means actuated by said first named means for producing a fluid pressure in accordance with the magnitude of the condition, a pressure balancing device comprising a first pressure chamber having a movable wall, a second pressure chamber having a movable wall, valve means for admitting and for discharging pressures from said second pressure chamber, valve members for controlling the flow of pressure fluid through each of said valve means, a fulcrumed beam within the second named pressure chamber for selectively actuating said valve members, yieldable means normally urging said valve members in a closed direction, means for transmitting movements of said movable walls to said fulcrumed beam for actuating said valve members, and means for urging said fulcrumed beam against said last named means.

8. In a control system for maintaining a condition at a predetermined value, in combination, a fluid pressure conduit, valve means having a neutral position in said conduit for controlling admission to and waste of pressure fluid therefrom, means for displacing said valve means from the neutral position to admit pressure fluid to said conduit upon a change in magnitude of said condition in one sense, and to waste fluid pressure from said conduit upon a change in magnitude of said condition in opposite sense, means tending to restore said valve means to the neutral position controlled by the pressure fluid within said conduit, and means controlled by the pressure of the fluid within the conduit tending to prevent the valve means from remaining in neutral position until the condition attains the predetermined value.

9. In combination, a casing defining a pair of chambers separated by a pressure sensitive flexible partition, a second pair of chambers separated by a second pressure sensitive flexible partition, means operatively connecting said flexible partitions; and a supply and waste valve controlling a fluid pressure in one of said chambers under the control of said last named means.

10. A relay device comprising a member movable to and from a neutral position, fluid pressure supply and exhaust control means actuated by said member, pressure responsive motors acting on said member for impressing forces thereon proportional to the pressures within said pressure responsive motors; the first of said pressure responsive motors being responsive to a variable pressure, the second pressure responsive motor communicating with said fluid pressure supply and exhaust control means, means responsive to fluid pressure and including a chamber, said means impressing a force on said member proportional to the fluid pressure within said chamber, a restricted connection between said chamber and one of the pressure responsive motors for gradually changing the pressure within said chamber in response to the change in pressure within one of said pressure responsive motors, the resultant of the forces impressed on said member by said first pressure responsive motor and said means acting to move said member from its neutral position, said fluid pressure supply and exhaust control means being operated by said movable member to increase or decrease the pressure acting in the said second pressure responsive motor so that for each value of the resultant of the forces impressed on said member by said first pressure responsive motor and by said means, the member is moved toward its neutral position by the force impressed on said member by said second pressure responsive motor.

11. In a fluid pressure operated control system, in combination, a relay device comprising a member movable to and from a neutral position, fluid pressure supply and exhaust control means actuated by said member, pressure responsive motors acting on said member to impress forces thereon proportional to the pressures within said pressure responsive motors; the first of said pressure responsive motors being responsive to a variable fluid pressure proportional to a condition to be controlled, means responsive to fluid pressure and including a chamber, said means responsive to fluid pressure impressing a force on said movable member proportional to the pressure in said chamber, the resultant of the forces impressed on said member by the first fluid pressure motor and said means acting to move said movable member from its neutral position, the second of said pressure responsive motors in communication with the fluid pressure supply and exhaust control means and impressing on said member a force acting in opposition to the resultant of the forces impressed on said member by the first pressure responsive motor and said means, said fluid pressure supply and exhaust control means operated by said movable member to increase or decrease the pressure acting in the second pressure responsive motor so that for each value of the resultant of the forces impressed on said member by the first pressure responsive motor and said means, the member is moved toward its neutral position by the force impressed on said member by said second pressure responsive motor, a restricted passage between said chamber and one of the pressure responsive motors whereby an initial change in the pressure within the second pressure responsive motor due to a change in the pressure within the first pressure responsive motor is followed by a further change in the pressure within the second pressure responsive motor due to the change in pressure within said chamber and a fluid pressure servomotor responsive to the pressure within the second pressure responsive motor for regulating the rate of application of an agent affecting the condition.

HARVARD H. GORRIE.